US009367050B2

(12) United States Patent
Jain et al.

(10) Patent No.: US 9,367,050 B2
(45) Date of Patent: Jun. 14, 2016

(54) MAGNETIC FIELD COMMUNICATION ARRANGEMENT AND METHOD FOR MONITORING THE PRESENCE OF VECHICLES

(71) Applicant: Robert Bosch GmbH, Stuttgart (DE)

(72) Inventors: Vivek Jain, Mountain View, CA (US); Lakshmi Venkatraman, Mountain View, CA (US); Thomas Hogenmueller, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 265 days.

(21) Appl. No.: 14/032,471

(22) Filed: Sep. 20, 2013

(65) Prior Publication Data

US 2014/0022094 A1 Jan. 23, 2014

Related U.S. Application Data

(62) Division of application No. 12/639,432, filed on Dec. 16, 2009, now Pat. No. 9,158,290.

(51) Int. Cl.

| | |
|---|---|
| ***G08G 1/017*** | (2006.01) |
| ***G08G 1/07*** | (2006.01) |
| ***G05B 11/01*** | (2006.01) |
| ***B60R 16/02*** | (2006.01) |
| ***G01D 21/00*** | (2006.01) |
| ***G01F 23/00*** | (2006.01) |
| ***G01F 23/22*** | (2006.01) |
| ***G01K 1/02*** | (2006.01) |

(Continued)

(52) U.S. Cl.

CPC ................ *G05B 11/01* (2013.01); *B60R 16/02* (2013.01); *G01D 21/00* (2013.01); *G01F 23/0069* (2013.01); *G01F 23/22* (2013.01); *G01K 1/024* (2013.01); *G01K 13/00* (2013.01); *G08B 21/18* (2013.01); *G08G 1/017* (2013.01); *G08G 1/07* (2013.01)

(58) Field of Classification Search

CPC .... B60R 16/02; G01D 21/00; G01F 23/0069; G01F 23/22; G01K 13/00; G01K 1/024; G05B 11/01; G08B 21/18; G08G 1/017; G08G 1/07; G08G 1/14; G06Q 20/127; G07B 15/02; G07F 17/0014; G07F 17/246

See application file for complete search history.

(56) References Cited

U.S. PATENT DOCUMENTS 6,147,624 A * 11/2000 Clapper .................... 340/932.2
6,885,311 B2 * 4/2005 Howard et al. ........... 340/932.2
7,019,670 B2 * 3/2006 Bahar ....................... 340/932.2

(Continued)

OTHER PUBLICATIONS

IEEE Standard for Long Wavelength Wireless Network Protocol, Mar. 31, 2009, pp. 1-25.*

*Primary Examiner* — Hai Phan
*Assistant Examiner* — Sisay Yacob
(74) *Attorney, Agent, or Firm* — Maginot Moore & Beck LLP

(57) ABSTRACT

An automotive communication method includes installing a sensor within a vehicle such that the sensor is submerged in a liquid during operation of the vehicle and/or substantially surrounded by a metallic structure during operation of the vehicle. A long wave magnetic signal is transmitted from the sensor. The signal is indicative of a condition sensed by the sensor. The signal is wirelessly received at a controller disposed within the vehicle. Receipt of the signal at the controller is responded to by adjusting a display and/or a setting within the vehicle.

5 Claims, 10 Drawing Sheets broadcast a respective long wave magnetic identification signal from each of a plurality of vehicles, each of the identification signals uniquely identifying the vehicle from which the signal is broadcasted (602)

use a plurality of long wave magnetic signal readers to receive the identification signals from the vehicles, each of the readers receiving the identification signals from vehicles within a respective portion of the predetermined space (604)

automatically respond to the received identification signals by recording the identifications of the vehicles in association with each of the portions of the predetermined space and/or transmitting a response signal (606)

600

(51) Int. Cl.
*G01K 13/00* (2006.01)
*G08B 21/18* (2006.01)

(56) References Cited

U.S. PATENT DOCUMENTS

2002/0030606 A1* 3/2002 Chauvin et al. ............ 340/932.2
2002/0109611 A1* 8/2002 Howard ..................... 340/932.2
2003/0069686 A1* 4/2003 Watanabe et al. ............. 701/200
2003/0074129 A1* 4/2003 Curbow et al. ............... 701/200
2003/0132840 A1* 7/2003 Bahar ........................... 340/541
2005/0099320 A1* 5/2005 Nath et al. .................... 340/933
2008/0158010 A1* 7/2008 Nath et al. ................. 340/932.2
2010/0069035 A1* 3/2010 Johnson ..................... 455/404.1

* cited by examiner

MAGNETIC FIELD COMMUNICATION ARRANGEMENT AND METHOD FOR MONITORING THE PRESENCE OF VECHICLES

BACKGROUND

1. Field of the Invention

The present invention relates to automotive communication systems, and, more particularly, to wireless automotive communication systems.

2. Description of the Related Art

Traditionally wired communication is used in vehicular communication applications, while radio frequency (RF) based wireless communication is employed in some limited applications. Typically, automotive body domain applications such as seat control, window lift, mirror adjustment, and light control are distributed over the entire car and are interconnected via field bus communication systems. Current architectures have grown fast over the last decades as more and more convenience functions are introduced to the automotive industry. In order to connect the peripherals, a large number of cables may be necessary, which increases the complexity of the cable harness, increases the weight of the car, and increases the costs of the car. The increase in the number of cables may also lead to reliability problems in areas where the cable harness is mounted on moveable parts such as the side mirror, doors, seat, etc.

In order to avoid the above-described problems associated with hard-wired communication systems, it is known for radio frequency (RF) wireless communication to be employed between and within various systems within a vehicle, such as an automobile. Attaining reliable RF communication with good performance is problematic within a vehicle, however, because RF communication is deeply affected by fading due to multipath, and human and metallic obstructions inside the vehicle.

Recently, long wave (LW) magnetic signals based communication has been adopted at IEEE 1902.1 standard, also known as RuBee. Magnetic wave communication has an added advantage of passing through metals and liquids and thus can be used at locations which are hazardous/hard-to-wire or require precise localization (e.g., computation of the two-dimensional or three-dimensional position of each node relative to each other).

What is neither disclosed nor suggested in the art is a communication system for a vehicle that avoids the above-mentioned problems and disadvantages associated with known wired communication systems and with RF communication systems.

SUMMARY OF THE INVENTION

The present invention is targeted towards using magnetic signals for communication in vehicular applications. The present invention may be applicable for automotive networks as well as for other applications. For example, the principles of the present invention may be applied to industrial networks, cargo, airplanes, ships, etc. However, a major advantage of magnetic communication over RF based wireless communication is better performance in the presence of metallic/non-metallic obstructions. Thus, because vehicles typically have a large number of obstructions and structures confined to a small space, the utilization of magnetic communication according to the present invention may enable sensors and other wireless devices to be placed at locations with the vehicle at which it has been heretofore impossible to place such sensors.

The invention comprises, in one form thereof, an automotive communication method including installing a sensor within a vehicle such that the sensor is submerged in a liquid during operation of the vehicle and/or substantially surrounded by a metallic structure during operation of the vehicle. A long wave magnetic signal is transmitted from the sensor. The signal is indicative of a condition sensed by the sensor. The signal is wirelessly received at a controller disposed within the vehicle. Receipt of the signal at the controller is responded to by adjusting a display and/or a setting within the vehicle.

The invention comprises, in another form thereof, a tractor-trailer arrangement including a trailer having at least one wall separating an interior of the trailer from an ambient environment. A door having an open position and a closed position is disposed in one wall. A wireless door contact sensor senses whether the door is in the open position or the closed position, and transmits a sequence of long wave magnetic signals. Each of the signals is indicative of whether the door is in the open position or the closed position at a respective point in time. A tractor unit is mechanically coupled to the trailer. The tractor unit includes a controller receiving the long wave magnetic signals from the sensor, and controlling presentation of information on the audio speaker and/or video display dependent upon the received signals.

The invention comprises, in yet another form thereof, a method of monitoring the presence of vehicles within a predetermined space, including broadcasting a respective long wave magnetic identification signal from each of a plurality of vehicles. Each of the identification signals uniquely identifies the vehicle from which the signal is broadcasted. A plurality of long wave magnetic signal readers are used to receive the identification signals from the vehicles. Each of the readers receives the identification signals from vehicles disposed within a respective portion of the predetermined space. The received identification signals are automatically responded to by recording the identifications of the vehicles in association with each of the portions of the predetermined space and/or transmitting a response signal.

The invention comprises, in still another form thereof, a method of locking and unlocking a door of a vehicle. A long wave magnetic signal is transmitted from a keyfob. The signal includes an identifier corresponding to a respective vehicle. The keyfob includes an actuatable control, such as a pushbutton, for example. The long wave magnetic signal is transmitted in response to the actuatable control being actuated by a user. The long wave magnetic signal is received at the respective vehicle. The identifier is recognized as corresponding to the respective vehicle. The recognizing is performed within the respective vehicle. In response to the recognizing, a door of the respective vehicle is automatically changing from a locked state to an unlocked state or from an unlocked state to a locked state.

An advantage of the present invention is that magnetic wireless communication may operate reliably in the presence of metal, liquids, dirt, etc., and thus can be employed in harsh environments.

Another advantage is that magnetic wireless communication has very low signal strength outside of the intended range, and hence provides greater security and reduced interference with other networks outside of the intended range.

Yet another advantage is that magnetic wireless communication has almost negligible electromagnetic interference (EMI), and hence better electromagnetic compatibility (EMC).

Still another advantage is that magnetic wireless communication-based devices can be embedded into metallic components and parts.

A further advantage is that magnetic wireless communication-based devices transmit at very low power, and thus are not hazardous to the human body and may have long battery lives.

A still further advantage is that magnetic wireless communication provides greater flexibility and accessibility than does wired networking. For example, magnetic wireless communication-based devices may be employed in hard-to-wire areas.

Another advantage as compared to hard-wired systems is the relative ease of aftermarket/ad hoc installations.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figures 1A, 1B:
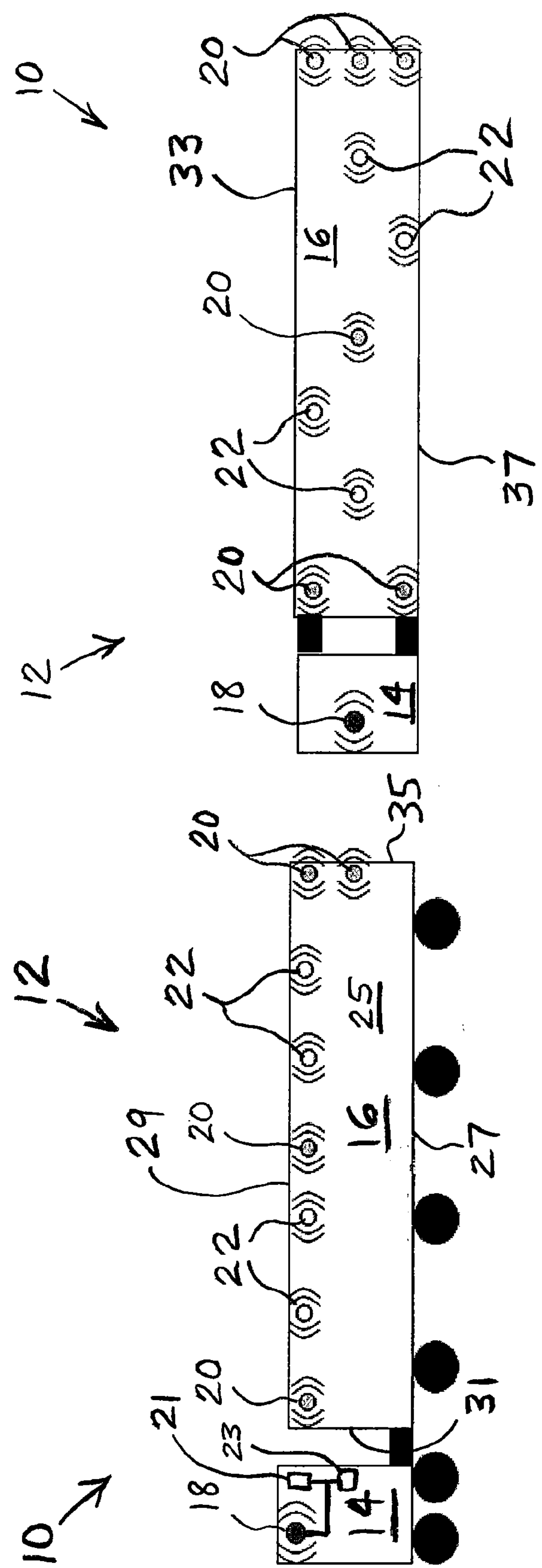
FIG. 1*a* is a schematic side view of one embodiment of a magnetic field communication arrangement of the present invention.
FIG. 1*b* is a schematic top view of the magnetic field communication arrangement of FIG. 1*a*.

Corresponding reference characters indicate corresponding parts throughout the several views. Although the drawings represent embodiments of the present invention, the drawings are not necessarily to scale and certain features may be exaggerated in order to better illustrate and explain the present invention. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Referring now to the drawings, and particularly to FIGS. 1*a-b*, there is shown one embodiment of a magnetic field communication arrangement 10 of the present invention, including a tractor-trailer 12 having a tractor unit 14 and a trailer 16. Arrangement 10 may include an electronic monitoring system having a sensor data receiver and control module 18 in wireless communication with magnetic communication-based wireless door contact sensors 20 and magnetic communication-based wireless motion/temperature/noise detectors 22. Module 18, sensors 20 and detectors 22 may transmit and/or receive long wave (LW) magnetic signals according to the IEEE 1902.1 communication standard, also known as RuBee. In addition, or in the alternative, module 18, sensors 20 and detectors 22 may transmit and/or receive LW magnetic signals having a carrier signal with a frequency approximately between 100 kHz and 500 kHz. In a particular embodiment, the LW magnetic signals have a carrier frequency of 131 kHz.

Motion/temperature/noise detectors 22 may monitor environmental parameters within trailer 16, such as movement, temperature, humidity, noise level, etc. while transporting animals, sensitive goods, etc. An interior 25 of trailer 16 may be defined by a floor 27, a ceiling 29, and four walls 31, 33, 35, 37 separating interior 25 from the ambient environment. One or more doors may be provided in any of floor 27, ceiling 29 and walls 31, 33, 35, 37.

Door contact sensors 20 may detect the presence of an intruder within trailer 16. More particularly, door contact sensors 20 may detect the status of the doors of trailer 16, e.g., whether each of the doors is in an open position or a closed position, and locked or unlocked. It may be important for the driver know that the doors of trailer 16 are always locked and/or closed. At any time, if the door of trailer 16 opens either accidentally or intentionally, the opening of the door may be detected by using wireless door contact sensors 20. The information from sensors 20 can be immediately transmitted directly to the driver using wireless magnetic field communication. Each of sensors 20 may transmit a sequence of long wave magnetic signals, and each of these signals may indicate whether a corresponding door in open or closed at the time of transmission of the signal. Depending upon the door structure, and to increase fault tolerance of the system, multiple door contact sensors 20 can be employed, as shown in FIGS. 1*a-b*.

The information from door contact sensors 20 can also be used for detecting the possible presence of a human intruder. For example, a human may open one of the doors in order to gain access to interior 25 of trailer 16. At least one of detectors 22 may be in the form of a motion detector that operates in conjunction with one or more door contact sensors 20 to thereby provide real time security information to the driver within tractor unit 14. In one embodiment, a motion detector 22 receives the wireless signal from sensor 20 indicating that a door has been opened. In response to receiving the signal, motion detector 22 may wake up and begin monitoring the space inside trailer 16 for motion.

In another embodiment, motion detector 22 is calibrated to sense the movement and/or shifting of the contents (e.g., animals) of trailer 16 during normal operation. However, in response to receiving the wireless signal from sensor 20 indicating that a door has been opened motion detector 22 switches to an alternate state of calibration that may be optimized to sense the movement of a human within trailer 16. In addition to the driver continually being informed and updated with regard to the open/closed position of the trailer door(s) and the state of motion within trailer 16, the driver may also be informed of whether motion detector is presently calibrated to sense human or non-human movement within trailer 16. Information may be presented to the driver via an audio speaker 21 and a display monitor 23, each of which may be hard-wired to controller 18.

In any of the above-described embodiments, the motion detector(s) may transmit a sequence of long wave magnetic motion signals. Each of the motion signals may be indicative of whether there is movement within the interior of the trailer at a respective point in time. Similarly, environmental sensor(s) 22 may transmit a sequence of long wave magnetic environmental signals. Each of the environmental signals may be indicative of a temperature or a humidity level with the interior of the trailer at a respective point in time. Control module 18 may receive long wave magnetic position signals from door contact sensor(s) 20, receive long wave magnetic motion signals from motion detector(s) 22, and receive long wave magnetic environmental signals from environmental sensors 22. Control module 18 may then control presentation of information on audio speaker 21 and/or video display 23 dependent upon the received position, motion and environmental signals.

The scope of the invention encompasses types of in-vehicle, magnetic field communication-based sensors and actuators other than those shown in FIGS. 1*a-b*. For example, the sensors and actuators contemplated by the invention may include carbon dioxide (CO2) sensors for air conditioning, contact sensors, daylight sensors, rain sensors, hi-beam sensors, lambda sensors, temperature sensors, air quality sensors, and so on. Possible actuators include, for example, push-buttons, switches, relays, motors, etc. Several applications such as driver detection and intrusion detection may also fall into this category.

The invention further contemplates the use of magnetic field communication-based devices in harsh (e.g., heat, in contact with or embedded in metal, disposed within a liquid) environments within a vehicle in which it would be difficult and/or hazardous to install and/or operate hard-wired devices. Examples of such harsh environments include engines, wheels, fuel tanks and fluid reservoirs. Sensors may be embedded within the engine to monitor temperature, fuel quality, etc. The entire node (e.g., including the sensor and the magnetic field-based communication module) may be embedded in, adhered to, disposed within, and/or surrounded by the engine.

Magnetic field sensors may be deployed within the wheel for applications such as tire pressure monitoring. Further, sensors within the wheel may also be used to detect wheel alignment, rotational velocity of the wheel, levels of load/balancing, etc.

Magnetic field sensors may also be disposed within fuel tanks and fluid reservoirs, and may perform well therein as magnetic signals are capable of passing through metal/liquid environments. Fuel and other fluids such as washer fluid, coolant, brake fluid, engine oil, etc. may be ideal monitoring applications for magnetic field sensors, and such sensors may provide an efficient way to measure the respective levels and/or temperatures of these fuels and fluids.

Another application of magnetic field communication-based devices contemplated by the present invention is in monitoring batteries in electric and hybrid vehicles. Batteries for electric vehicles are large and composed of hundreds of cells which may call for constant monitoring of voltage and current. Wired networks are not possible here due to flexibility and future upgradeability requirements. RF based wireless communication on the other hand is hampered by the poor quality of the wireless channel inside the battery pack. Hence, again magnetic wave-based communication is an ideal solution for this case.

According to the present invention, magnetic field communication-based devices may also be used in applications having precise localization requirements. Such applications may include localization of non-variable parts, passive keyless entry (keyfob applications), and intelligent transport systems. Each of these three applications is described in turn below.

Figure 2A:
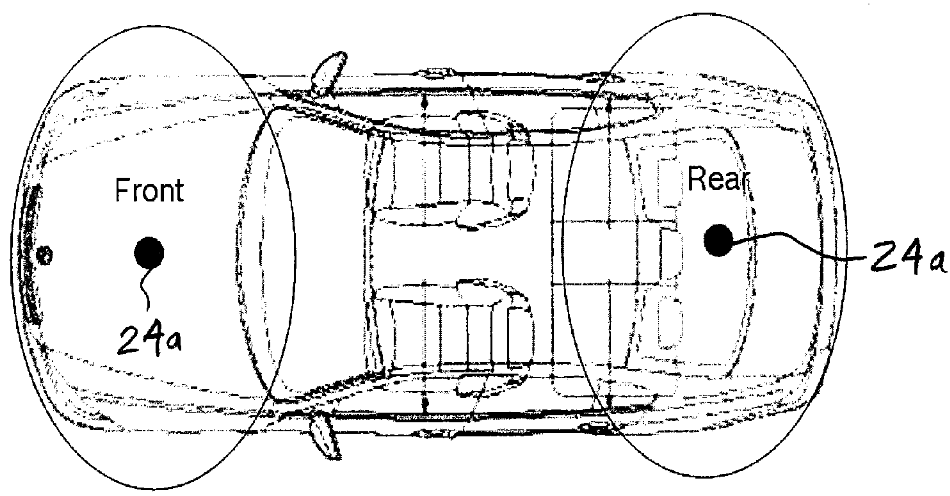
FIG. 2*a* is an overhead view of nodes placed for localizing at the front and rear of a vehicle according to one embodiment of the present invention.
Figure 2B:
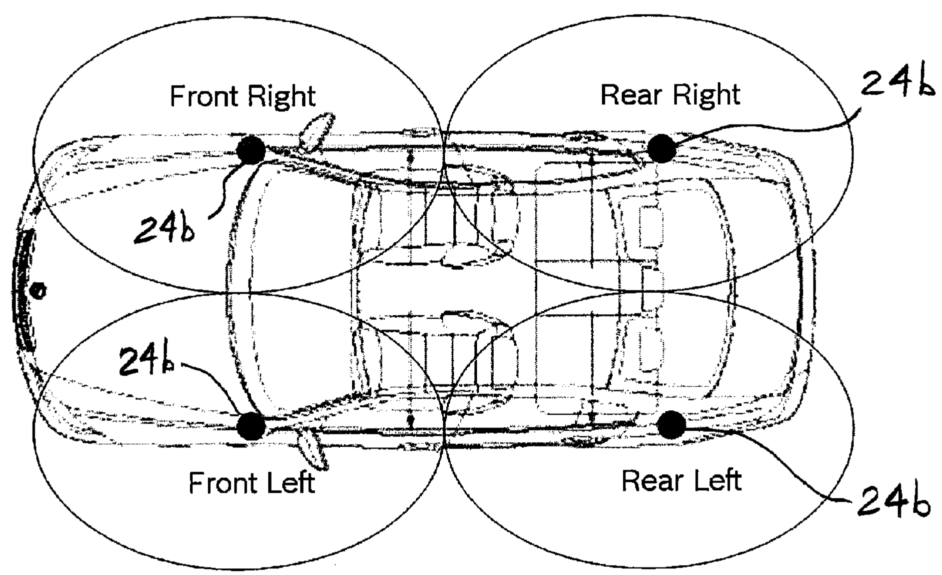
FIG. 2*b* is an overhead view of nodes placed for localizing at the four corners of a vehicle according to one embodiment of the present invention.
Figure 2C:
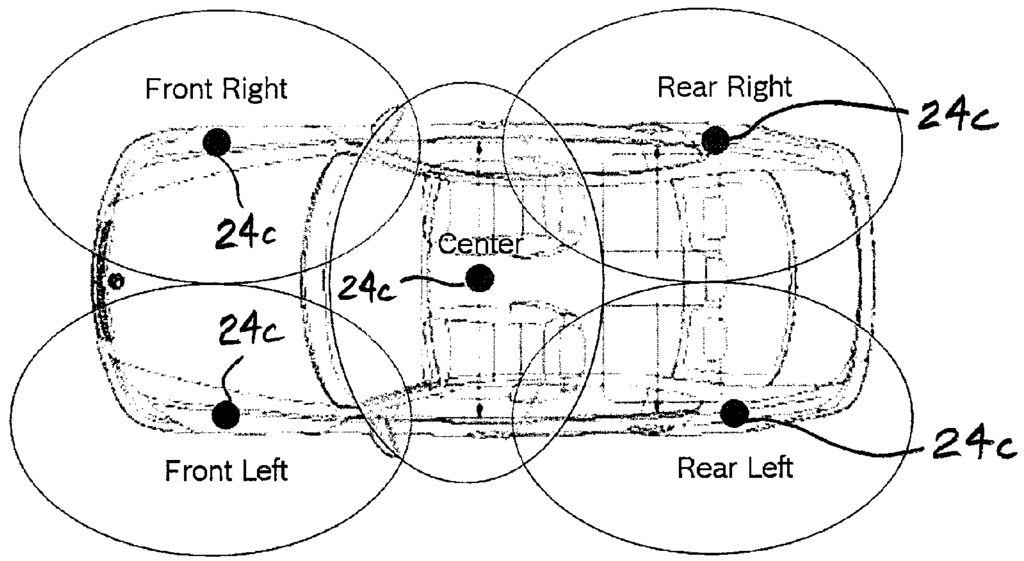
FIG. 2*c* is an overhead view of nodes placed for localizing at all locations of a vehicle according to one embodiment of the present invention.

The localization of non-variable parts application may address the problem of localizing/addressing nodes within a wireless network of non-variable parts. A magnetic wave based-communication scheme of the invention may be used to easily localize these non-variable nodes during the installation phase. As illustrated in FIGS. 2*a-c*, these nodes 24*a-c* can be placed temporarily at the locations in order to localize the nodes. Node localization may be performed as described in "Robust Distributed Node Localization with Error Management", Juan Liu, Ying Zhang and Feng Zhao, *MobiHoc* '06, May 22-25 2006; "Vision-Enabled Node Localization in Wireless Sensor Networks", Huang Lee and Hamid Aghajan, In Proc. of Cognitive Systems and Interactive Sensors (COGIS), March 2006; "Sextant: A Unified Node and Event Localization Framework Using Non-Convex Constraints", Saikat Guha, Rohan Narayan Murty and Emin Gun Sirer, *MobiHoc* '05, May 25-27 2005; "Robust Node Localization for Wireless Sensor Networks", Radu Stoleru, John A. Stankovic and Sang Son, EmNets '07, Jun. 25-26, 2007, and each of these four papers is hereby incorporated by reference herein in its entirety. Examples of non-variable nodes to which the localization techniques may be applied include temperature sensors for climate control, park pilot nodes, indicator lights, and so on. Further, these nodes can be placed in these locations permanently to function as localized group leaders and be part of network hierarchy. The broadcast range or reception range of an RF-based node may be dependent upon the surroundings. In contrast, the broadcast range or reception range of magnetic signals-based wireless communications may be independent of, and unaffected by, the surroundings. Hence, magnetic signals-based wireless communications may be better suited than RF-based wireless communications for localization solutions. Potential applications of magnetic signals-based localization techniques include: localizing tires, doors, windows, air-conditioning system, etc.; unlocking the desired door for keyless entry systems; and many others.

The passive Keyless Entry (Keyfob) application for magnetic field communication-based devices may improve upon the poor performance of known RF-based key fobs in parking lots or when a large number of other vehicles are nearby. This is poor performance may be primarily due to the presence of numerous metallic obstructions in such scenarios. Because magnetic wave communication is largely immune to metallic obstructions, the performance of magnetic-based communication devices may be better than that of RF devices in the presence of other vehicles. This characteristic leads to another advantage of magnetic field-based devices in that the driver detection range within the vicinity of the car may remain constant regardless of the surroundings, thereby making magnetic communication advantageous for implementation in a keyless passive entry system.

The intelligent transport systems applications for magnetic field-based communication devices may include metered parking, toll collection, lane detection, automatic traffic light signaling, parking spot validation and car tracking within the parking lot. Magnetic communication technology may be advantageous for use in such applications due to the technology's precise localization capability.

Figure 3A:
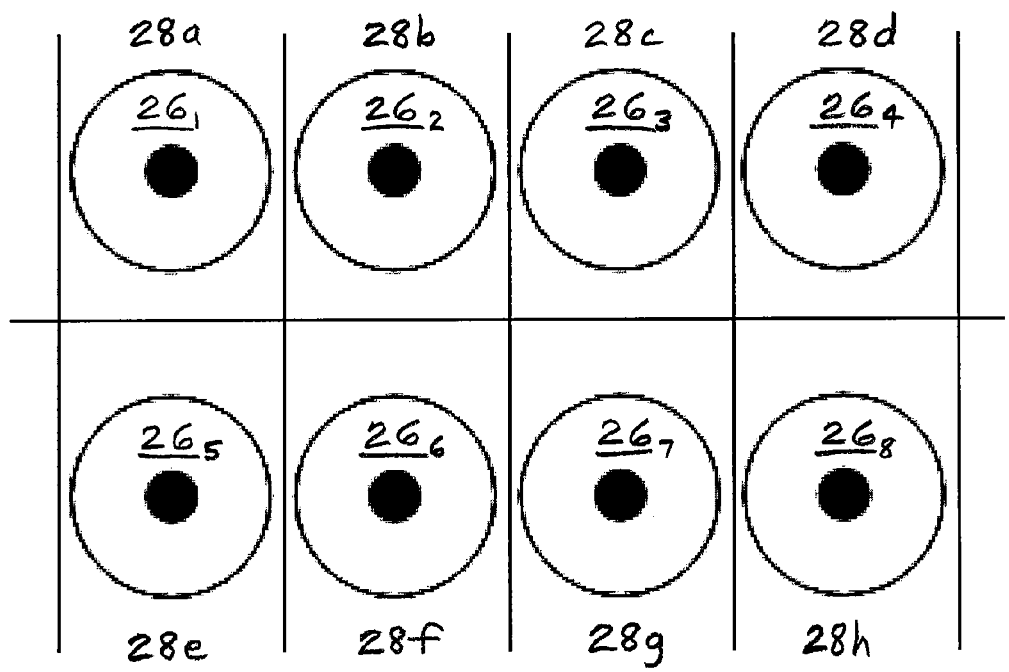
FIG. 3*a* is a schematic diagram of a respective magnetic card reader being assigned to each parking spot within a parking lot according to one embodiment of the present invention.
Figure 3B:
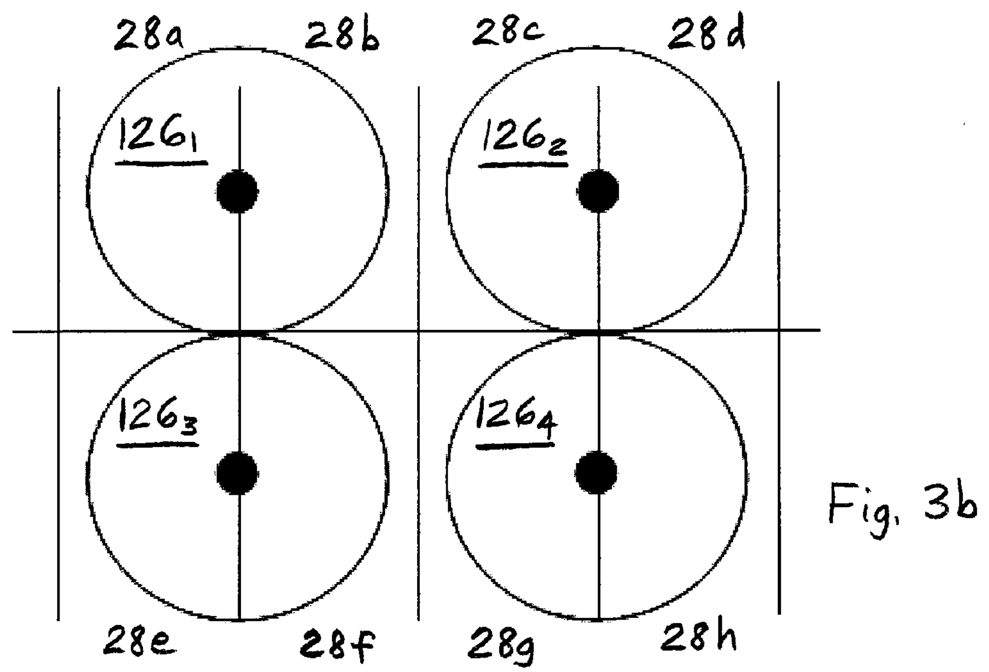
FIG. 3*b* is a schematic diagram of a respective magnetic card reader being assigned to each pair of side-by-side parking spots within a parking lot according to another embodiment of the present invention.
Figure 3C:
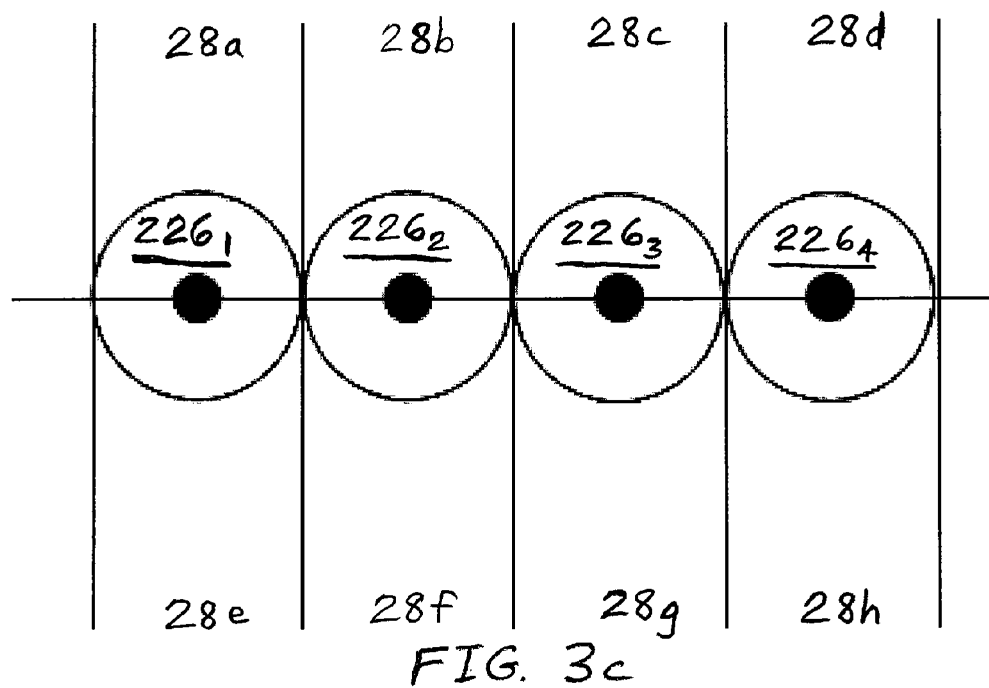
FIG. 3*c* is a schematic diagram of a respective magnetic card reader being assigned to each pair of end-to-end parking spots within a parking lot according to yet another embodiment of the present invention.
Figure 3D:
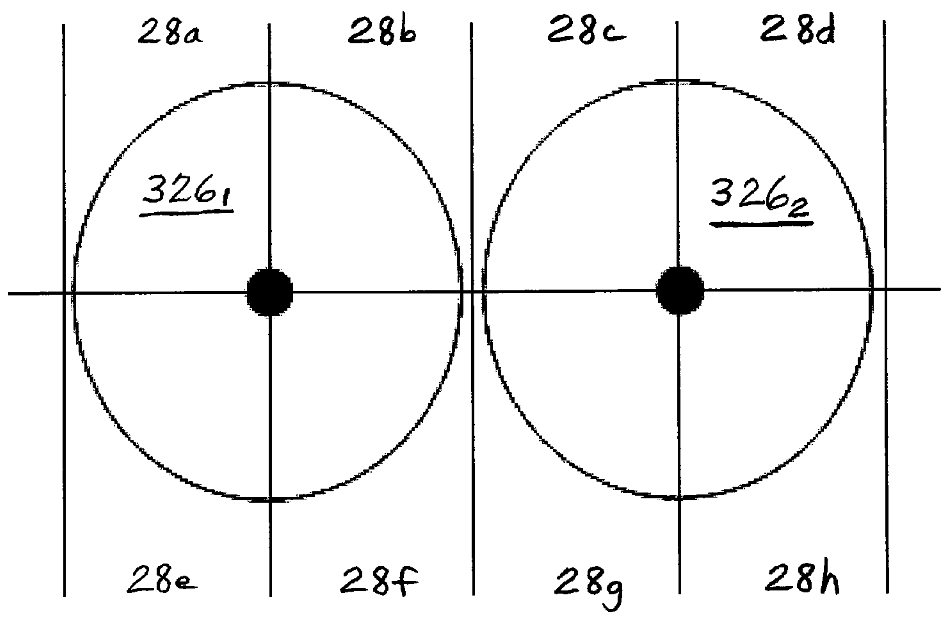
FIG. 3*d* is a schematic diagram of a respective magnetic card reader being assigned to each group of four parking spots within a parking lot according to still another embodiment of the present invention.

Taking the parking lot application as an example, each vehicle may include and carry a low-power magnetic field-based transmitter or "tag" that emits information identifying the vehicle. Electronic readers or receivers of these identification signals may be provided in the parking lot for identifying the vehicles within the lot, and in which parking space each of the vehicles is disposed. The readers may be employed for every single/pair/quad parking spots, as shown in FIGS. 3*a-d*. As schematically indicated in FIG. 3*a*, a respective one of readers $\mathbf{26}_1$ through $\mathbf{26}_8$ may be associated with each of parking spaces 28*a-h*. In another embodiment depicted in FIG. 3*b*, a respective one of readers $\mathbf{126}_1$ through $\mathbf{126}_4$ may be associated with each of four pairs 28*a/b*, 28*c/d*, 28*e/f*, 28*g/h* of parking spaces. In yet another embodiment depicted in FIG. 3*c*, a respective one of readers $\mathbf{226}_1$ through $\mathbf{226}_4$ may be associated with each of four pairs 28*a/e*, 28*b/f*, 28*c/g*, 28*d/h* of parking spaces. In still another embodiment depicted in FIG. 3*d*, a respective one of readers $\mathbf{326}_1$ through $\mathbf{326}_2$ may be associated with each of two quadruplets 28*a/b/e/f*, 28*c/d/g/h* of parking spaces. As compared to RF technology, the magnetic wave communication may result in a reduced number of false alarms for the aforementioned applications.

Figure 4A:
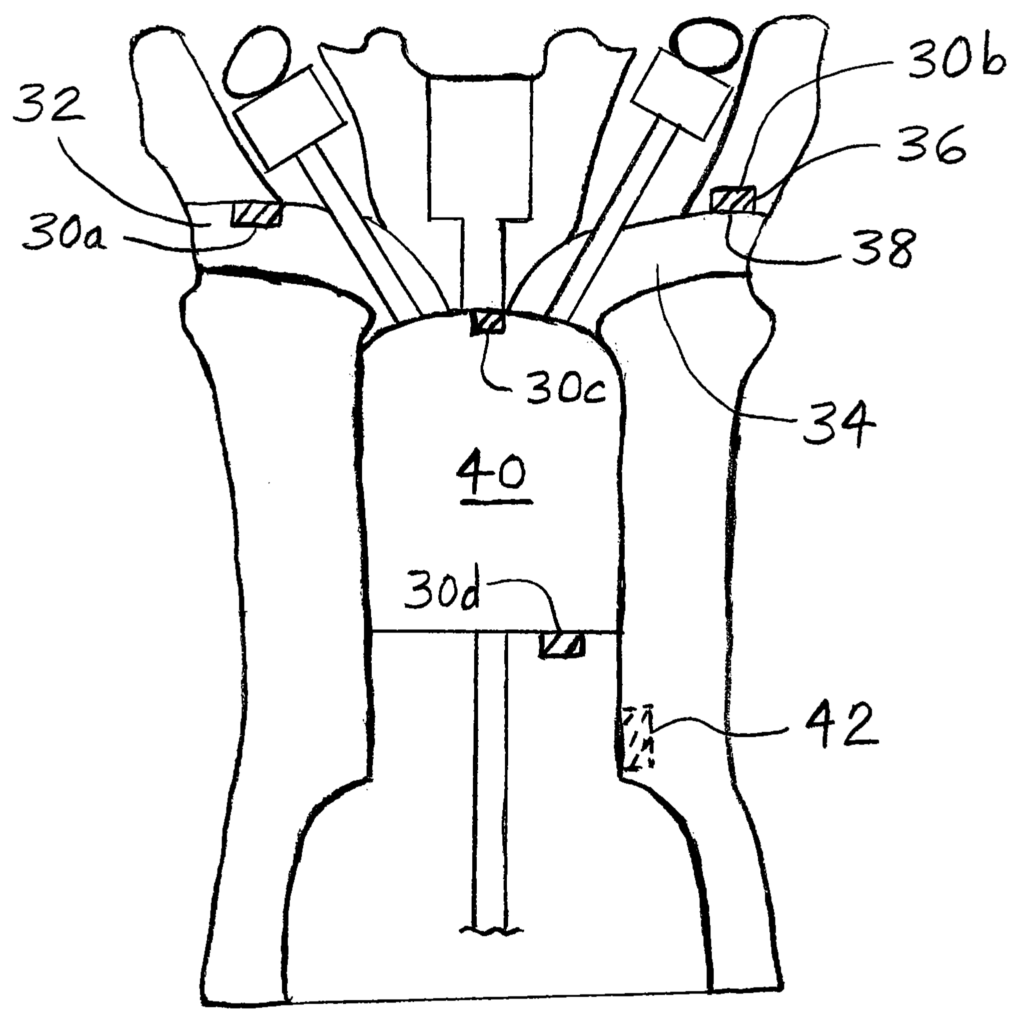
FIG. 4*a* is a side sectional view of a magnetic field-based communication device disposed within the structure of a vehicle engine.

Illustrated in FIG. 4*a* is one embodiment of an engine having four magnetic field-based sensors 30*a-d*, which may be temperature sensors, for example. Sensor 30*a* is adhered to, welded to, or otherwise attached to an inner wall of an air inlet 32. Sensor 30*b* is embedded in an inner wall of a fuel inlet 34. That is, the inner wall of inlet 34 may have a recess 36 for receiving sensor 30*b* therein such that an exposed surface 38 of sensor 30*b* is flush with the inner wall and a smooth, continuous surface is thereby provided. Thus, sensor 30*b* does not impede the flow of fuel into the engine. Sensor 30*c* is similarly embedded in a top surface of a piston 40. Sensor 30*d* is attached to a bottom surface of piston 40. Alternatively, sensor 30*d* could be embedded into a cylinder wall, as indicated with dashed lines at 42. All of the walls and structure of the engine may be formed of metal, such as steel, except possibly for sensors 30*a-d*.

Figure 4B:
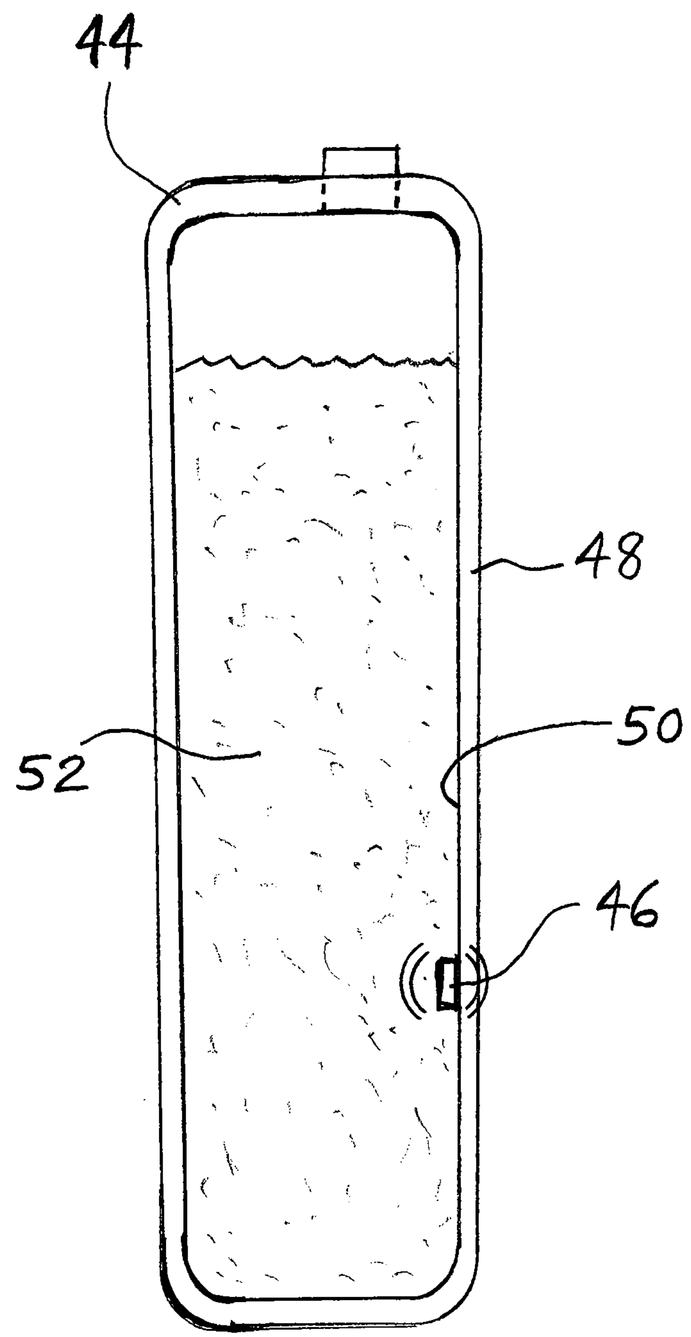
FIG. 4*b* is a side sectional view of a magnetic field-based communication device disposed within the structure of a vehicle coolant radiator.

Illustrated in FIG. 4*b* is one embodiment of an automotive radiator 44 having a magnetic field-based sensor 46, which may be a temperature sensor, for example. Sensor 46 is adhered to, welded to, or otherwise attached to a wall 48 of radiator 44. However, in another embodiment, sensor 46 is embedded in an inner surface 50 of wall 48. As shown in FIG. 4*b*, sensor 46 may be installed at a vertical level such that sensor 46 is submerged in liquid coolant 52 during normal operation. Radiator 44 may be formed of metal such that sensor 46 is surrounded by the metallic structure of radiator 44.

Figure 4C:
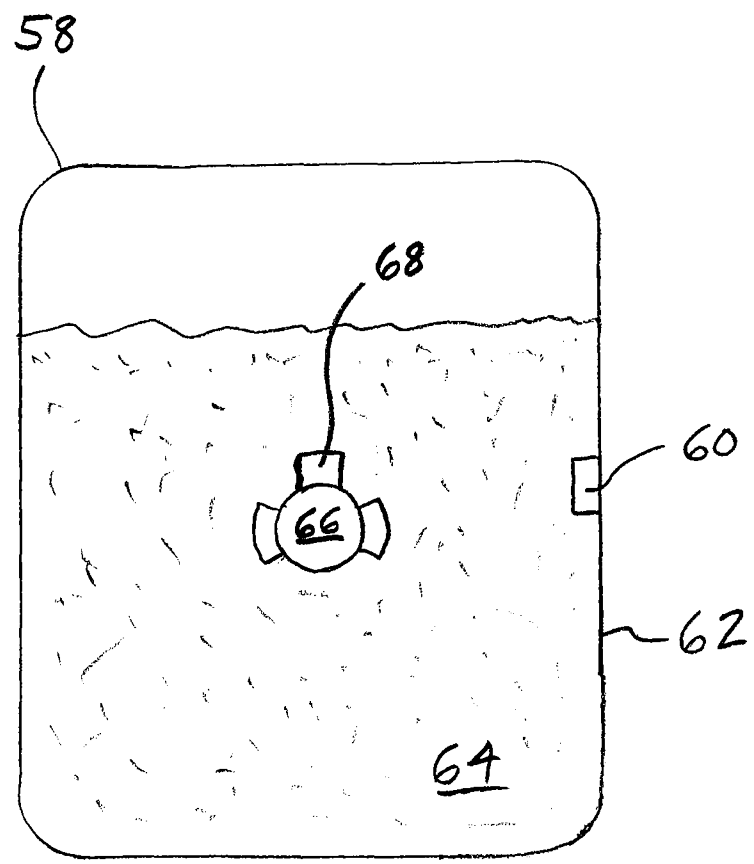
FIG. 4*c* is a side sectional view of a magnetic field-based communication device and motor assembly disposed within the structure of a vehicle windshield washer reservoir.

Illustrated in FIG. 4*c* is one embodiment of an automotive windshield washer reservoir 58 having a magnetic field-based sensor 60, which may be a temperature sensor, for example. Sensor 60 is adhered to, welded to, or otherwise attached to a wall 62 of reservoir 58. However, in another embodiment, sensor 60 is embedded in an inner surface of wall 62. As shown in FIG. 4*c*, sensor 60 may be installed at a vertical level such that sensor 60 is submerged in liquid washer fluid 64 during normal operation. Reservoir 58 may be formed of metal, or may be formed of plastic and may be surrounded by metal, such that sensor 60 is surrounded by a metal structure. Also submerged in fluid 64 may be a motor assembly including a motor 66 and a control module 68. Motor 66 may pump fluid 64 onto the windshield in response to the driver actuating a control button, for example. Control module 68 may have a magnetic field-based receiver for receiving long wave magnetic signals from sensor 60 or from a central controller (not shown). In one example embodiment, sensor 60 detects whether fluid 64 is in a liquid state or a frozen solid state. If long wave (LW) magnetic signals from sensor 60 indicate that fluid 64 is frozen, then long wave (LW) magnetic signals may be transmitted to module 68, either directly from sensor 60 or from the central controller, instructing module 68 to inhibit operation of motor 66 in response to the driver actuating the control button. Thus, damage to motor 66 from attempting to operate in a frozen environment may be avoided. Further, the central controller may send a signal to a display or audio speaker in the passenger compartment to inform the driver that the washer fluid is frozen. When sensor 60 senses that fluid 64 as liquefied, then sensor 60 may transmit another signal so indicating to the central controller, and the driver may be notified that the windshield washer pump is now operable.

Figure 5:
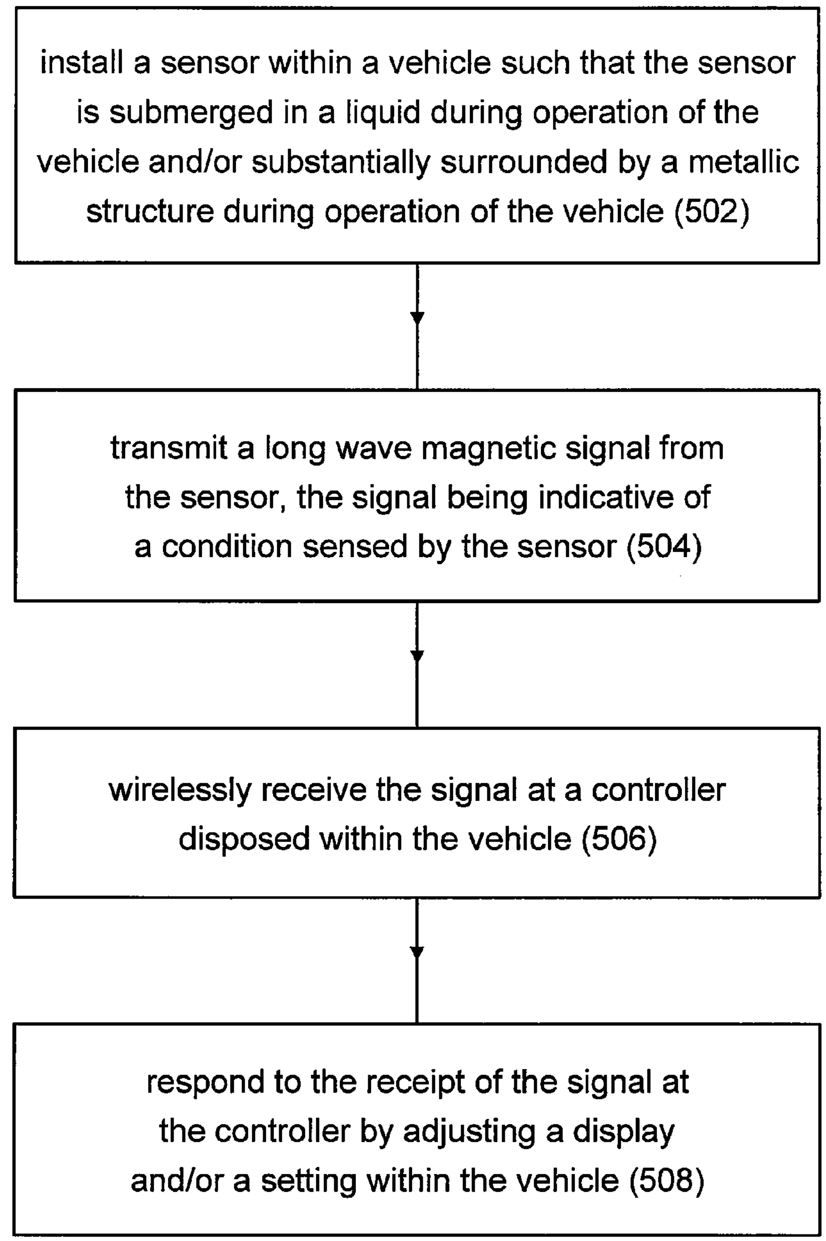
FIG. 5 is a flow chart illustrating one embodiment of a magnetic field communication method of the present invention.

One embodiment of an automotive communication method 500 of the present invention is illustrated in FIG. 5. In a first step 502, a sensor is installed within a vehicle such that the sensor is submerged in a liquid during operation of the vehicle and/or substantially surrounded by a metallic structure during operation of the vehicle. For example, a sensor 46 (FIG. 4*b*) may be installed in a vehicle such that sensor 46 is attached to a wall 48 of radiator 44. When radiator 44 is filled with liquid coolant during operation, sensor 46 may be submerged in the coolant. Further, sensor 46 may be surrounded by the metallic structure of radiator 44. As another example, each of sensors 30*a-d* (FIG. 4*a*) may be installed in a vehicle such that each of sensors 30*a-d* is surrounded by the metallic structure of the vehicle's engine. Such installation positions may result in poor performance if any of these sensors relied on RF communication.

In a second step 504, a long wave magnetic sensor signal is transmitted from the sensor. The sensor signal is indicative of a condition sensed by the sensor. That is, any of sensors 30*a-d*, 46 may transmit a signal conforming to the IEEE 1902.1 standard and/or having a carrier frequency of approximately between 100 kHz and 500 kHz. The signal may contain information pertaining to a condition sensed by the sensor, such as temperature, humidity, voltage, force, pressure, etc.

Next, in step 506, the signal is wirelessly received at a controller disposed within the vehicle. More particularly, a central controller (e.g., an engine control module) may include a receiver configured to receive long wave magnetic signals.

In a final step 508, receipt of the signal at the controller is responded to by adjusting a display and/or a setting within the vehicle. For example, a temperature gauge or a temperature warning light on a dashboard of the vehicle may be adjusted to reflect the temperature sensed by the sensor. As another example, an engine control module may change the fuel-to-air mixture in the engine to optimize fuel efficiency at the current temperatures at various locations within the engine as sensed by sensors 30*a-d*.

Figure 6:
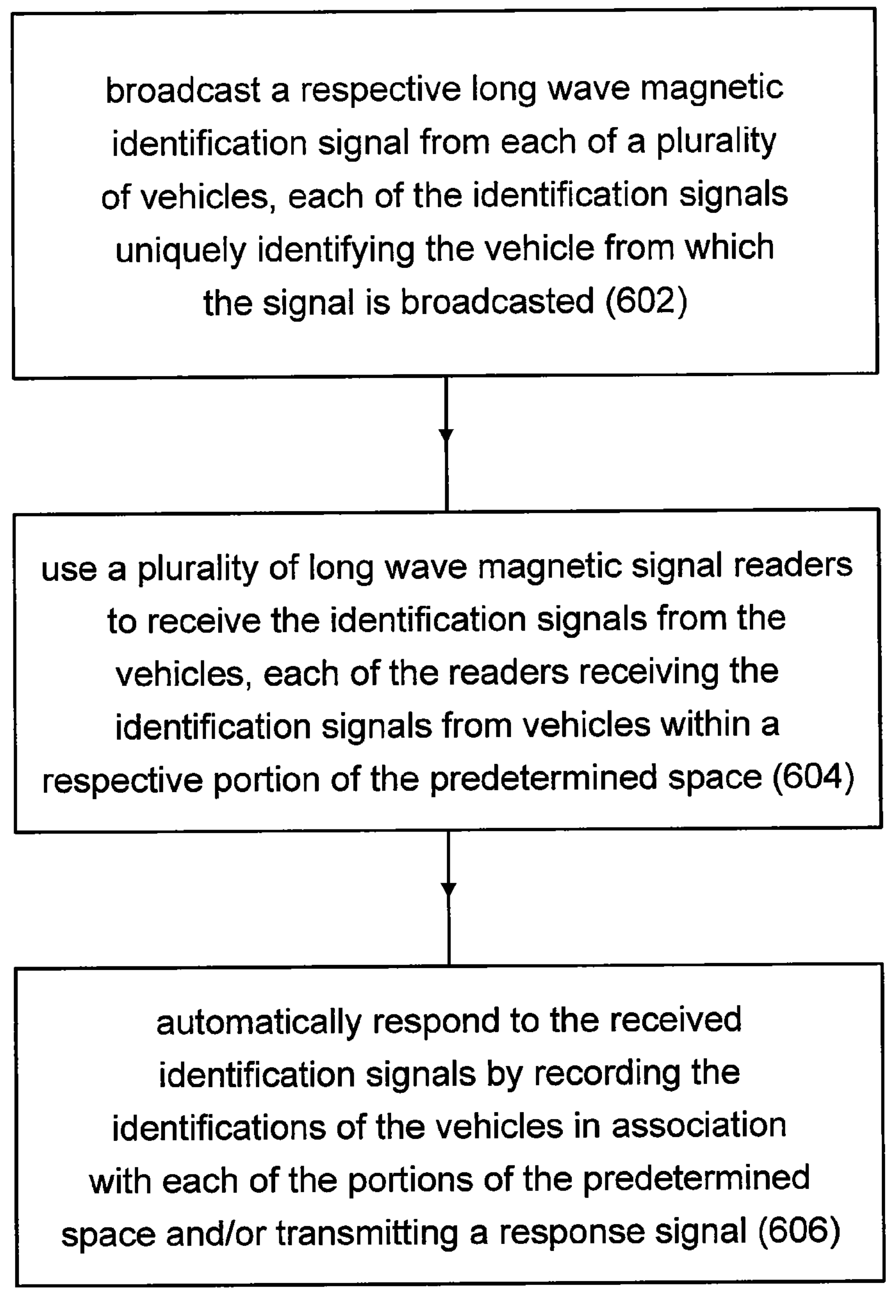
FIG. 6 is a flow chart illustrating one embodiment of a method of the present invention for monitoring the presence of vehicles within a predetermined space.

One embodiment of a method 600 of the invention for monitoring the presence of vehicles within a predetermined space is illustrated in FIG. 6. In a first step 602, a respective long wave magnetic identification signal is broadcast from each of a plurality of vehicles. Each of the identification signals uniquely identifies the vehicle from which the signal is broadcasted. For example, in the embodiments illustrated in FIGS. 3*a-d*, each vehicle disposed in any of parking spaces 28*a-h* may continuously or periodically transmit long wave magnetic identification signals specifying that particular vehicle's vehicle identification number (VIN). These signals may be broadcasted by the vehicle at all times, even when the vehicle's engine and ignition are turned off.

In a next step 604, a plurality of long wave magnetic signal readers are used to receive the identification signals from the vehicles. Each of the readers receives the identification signals from vehicles disposed within a respective portion of the predetermined space. In the embodiment of FIG. 3*a*, long wave magnetic signal readers $\mathbf{26}_{1\text{-}8}$ may receive identification signals transmitted by any vehicles in parking spaces 28*a-h*, respectively. For example, each of readers $\mathbf{26}_{1\text{-}8}$ may be centrally located above or below its respective one of parking spaces 28*a-h*. Because of the short broadcast range or reception range of long wave magnetic signals, each of readers $\mathbf{26}_{1\text{-}8}$ so positioned may be capable of receiving the identification signal of only a vehicle parked within two to three feet of the reader in the reader's corresponding parking space. Taking as another example the embodiment of FIG. 3*b*, each of readers $\mathbf{126}_{1\text{-}4}$ may be centrally located above or below the border between an adjacent pair of the eight parking spaces 28*a-h*. Because of the short broadcast range or reception range of long wave magnetic signals, each of readers $\mathbf{26}_{1\text{-}4}$ so positioned may be capable of receiving the identification signal of only vehicles parked within two to three feet to either side of the reader in the reader's pair of corresponding parking spaces.

In a final step 606, the received identification signals are automatically responded to by recording the identifications of the vehicles in association with each of the portions of the predetermined space and/or transmitting a response signal. That is, readers $\mathbf{26}_{1\text{-}8}$ may be each connected to a central controller and memory device such that the identification of which vehicle is parked in which parking spot may be recorded. In addition, or in the alternative, a response signal may be transmitted in the form of a signal to an accounting server instructing that the identified vehicles' accounts be charged with the monetary fee for parking for a particular time period. Another example of a response signal may be a signal to an electronic display sign along the border of the parking lot indicating that the parking lot is full (e.g., each parking space is occupied), or that a particular row of parking spaces are full, or indicating the locations of parking spaces that are unoccupied. The display sign may then produce a graphic and/or textual display conveying to human viewers the information indicated in the signal. Thus, a response signal, among other possibilities, may indicate a respective monetary fee to be charged to each of the vehicles whose identification signals are received, may indicate whether a vehicle whose identification signal is received is authorized to park in the portion of the predetermined space, or may control a traffic light, such as at an intersection of two streets. More particularly, in the traffic control scenario, readers could detect whether vehicles are stopped at the intersection waiting for the light to change. If so, then the lights may be changed immediately such that the oncoming cross traffic is given a yellow light and then a red light, and the stopped vehicle is given a green light, for example.

Figure 7:
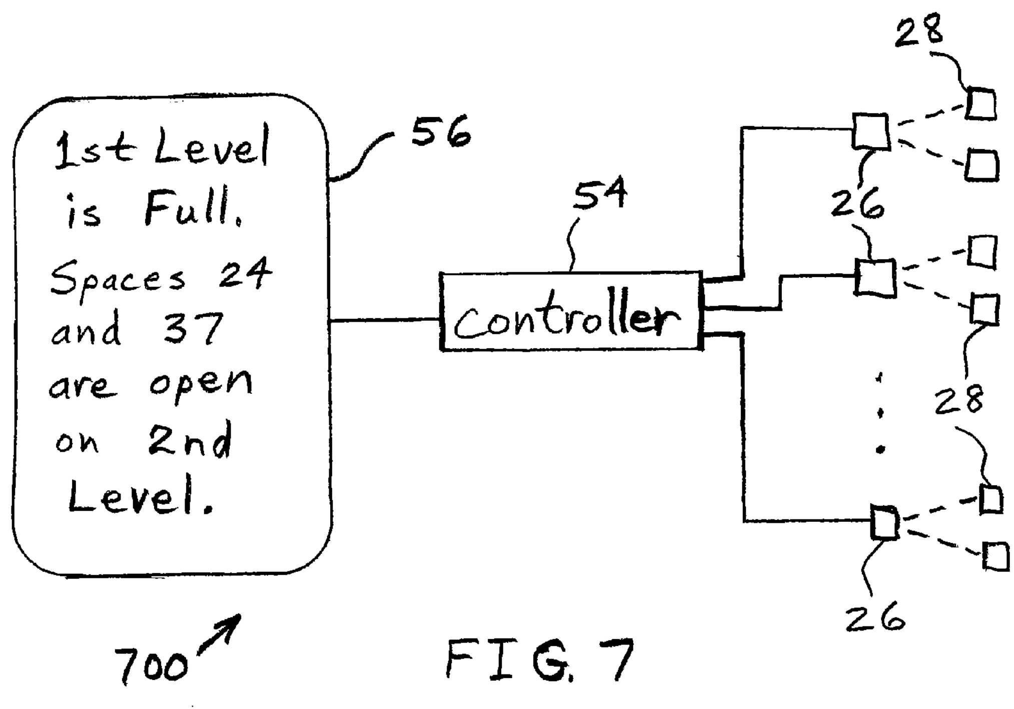
FIG. 7 is a block diagram of one embodiment of a parking garage arrangement of the present invention.

A specific example of a parking garage arrangement 700 which may employ method 600 is illustrated in FIG. 7. Each of a plurality of readers 26 monitors a pair of adjacent parking spaces 28, and each reader 26 may be able to discern whether both, one, or neither of its corresponding pair of parking spaces is occupied. Readers 26 may report the occupancy states of parking spaces 28 to a controller 54 which controls an electronic display sign 56 accordingly. Sign 56 may inform a viewer of where unoccupied parking spaces can be found in the garage. Each of the multiple parking spaces monitoring by a single reader may be labeled and referred to with a common numerical identifier (e.g., "spaces 24" or "37" as in FIG. 7), which provides enough specificity for the viewer/driver to find the group of parking spaces and visually find an empty one among the group of parking spaces.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of monitoring the presence of vehicles within a predetermined space, said method comprising the steps of:

periodically broadcasting a respective long wave magnetic identification signal from each of a plurality of vehicles, each of the identification signals uniquely identifying the vehicle from which the signal is broadcasted;

using a plurality of long wave magnetic signal readers to receive the identification signals from the vehicles, each of the long wave magnetic signal readers being associated with at least one parking space of a plurality of parking spaces within a parking lot;

detecting the presence of a vehicle in a parking space in response to the long wave magnetic signal reader associated with the parking space receiving the long wave magnetic identification signal from one of the vehicles; and automatically responding to the received identification signals by recording the identifications of the vehicles in association with each of the portions of the predetermined space and/or transmitting a response signal.

2. The method of claim 1, wherein the automatically responding step includes transmitting a response signal that is indicative of a respective monetary fee to be charged to each of the vehicles whose identification signals are received.

3. The method of claim 1, wherein the automatically responding step includes transmitting a response signal that is indicative of whether a vehicle whose identification signal is received is authorized to park in the portion of the predetermined space.

4. The method of claim 1, wherein the long wave magnetic identification signal is broadcast from each of the plurality of vehicles while the vehicle's engine and ignition are turned on and while the vehicles's engine and ignition are turned off.

5. The method of claim 1, wherein each of the long wave magnetic signal readers is associated with at least two parking spaces, wherein each of the long wave magnetic signal readers is configured to communicate an occupancy state of the at least two parking spaces associated with the long wave magnetic signal reader to a controller, and wherein the controller is configured to operate a display so as to visually indicate the parking spaces of the plurality of parking spaces of the parking lot which are not occupied by a vehicle.

* * * * *